United States Patent
Ramella-Roman et al.

(10) Patent No.: US 12,478,271 B2
(45) Date of Patent: Nov. 25, 2025

(54) DEVICES AND METHODS FOR PUMPLESS BLOOD PRESSURE MEASUREMENT

(71) Applicants: Jessica Claudia Ramella-Roman, Miami, FL (US); Tananant Boonya-Ananta, Miami, FL (US)

(72) Inventors: Jessica Claudia Ramella-Roman, Miami, FL (US); Tananant Boonya-Ananta, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 137 days.

(21) Appl. No.: 18/332,252

(22) Filed: Jun. 9, 2023

(65) Prior Publication Data
US 2024/0016398 A1 Jan. 18, 2024

Related U.S. Application Data

(60) Provisional application No. 63/368,424, filed on Jul. 14, 2022.

(51) Int. Cl.
*A61B 5/022* (2006.01)
*A61B 5/00* (2006.01)
*A61B 5/021* (2006.01)

(52) U.S. Cl.
CPC ......... *A61B 5/02233* (2013.01); *A61B 5/681* (2013.01); *A61B 5/742* (2013.01); *A61B 2562/0247* (2013.01)

(58) Field of Classification Search
CPC ..... A61B 5/02233; A61B 5/681; A61B 5/742; A61B 2562/0247; A61B 5/6824
See application file for complete search history.

(56) References Cited

U.S. PATENT DOCUMENTS

| | | | | |
|---|---|---|---|---|
| 5,941,828 | A * | 8/1999 | Archibald | A61B 5/6843 600/494 |
| 6,636,760 | B1 * | 10/2003 | Casey | G01L 9/0007 73/705 |
| 2010/0234743 | A1 * | 9/2010 | Kohyama | A61B 5/02233 600/499 |
| 2015/0374248 | A1 * | 12/2015 | Hu | A61B 5/02225 600/491 |

(Continued)

FOREIGN PATENT DOCUMENTS

| | | | |
|---|---|---|---|
| CN | 113485085 A | * 10/2021 | |
| WO | WO-2017145922 A1 | * 8/2017 | A61B 17/132 |

OTHER PUBLICATIONS

Machine translation of CN-113485085A (Year: 2021).*

*Primary Examiner* — Justin Xu
(74) *Attorney, Agent, or Firm* — SALIWANCHIK, LLOYD & EISENSCHENK

(57) ABSTRACT

Systems, devices, and methods for measuring blood pressure without the use of a pump are provided. A pumpless blood pressure measuring system or device can be wearable for long periods of time comfortably. The pumpless blood pressure measuring system or device can include a body, at least one tension band connected to the body, at least one pressure sensor configured to be in direct physical contact with the user's body, and a tourniquet mechanism. The tourniquet mechanism can be tightened to lead to artery occlusion such that the at least one pressure plate can determine the blood pressure of the user/wearer.

13 Claims, 24 Drawing Sheets

(56) References Cited

U.S. PATENT DOCUMENTS

| | | | |
|---|---|---|---|
| 2017/0095171 A1* | 4/2017 | Park | A61B 5/02007 |
| 2017/0312165 A1* | 11/2017 | Johnson | A61B 5/021 |
| 2019/0357779 A1* | 11/2019 | Park | A61B 5/02241 |
| 2021/0068682 A1* | 3/2021 | Easson | A61B 5/6843 |
| 2021/0128073 A1* | 5/2021 | Lee | A61B 5/02416 |
| 2022/0233085 A1* | 7/2022 | Lee | A61B 5/7275 |
| 2022/0313275 A1* | 10/2022 | Peters | A61B 17/1327 |
| 2022/0400958 A1* | 12/2022 | He | A61B 5/1172 |
| 2023/0012280 A1* | 1/2023 | Hoffman | A61B 17/1325 |
| 2023/0157593 A1* | 5/2023 | Kim | A61B 5/0205 |
| | | | 600/301 |

\* cited by examiner

DEVICES AND METHODS FOR PUMPLESS BLOOD PRESSURE MEASUREMENT

CROSS-REFERENCE TO RELATED APPLICATION

This application claims the benefit of U.S. Provisional Application Ser. No. 63/368,424, filed Jul. 14, 2022, the disclosure of which is hereby incorporated by reference in its entirety, including all figures, tables, and drawings.

GOVERNMENT SUPPORT

This invention was made with government support under 1648451 awarded by the National Science Foundation. The government has certain rights in the invention.

BACKGROUND

The monitoring and measurement of blood pressure is an important tool in early diagnosis of diseases related to the heart and blood movement, such as heart failure, coronary heart disease, and stroke. These diseases affect many people, with many different types of heart disease being possible, as shown in FIGS. 1 and 2.

Current systems for measuring blood pressure generally include a blood pressure cuff for either the wrist or the upper arm. Such systems are not wearable (i.e., are not practical to be worn throughout most or all of the day). Even at-home systems for measuring blood pressure typically include a cuff for either the wrist or the upper arm, which uses inflation to apply pressure and lead to occlusion of the artery. Changes in pressure and vibration signals are used to determine systolic and diastolic blood pressure.

BRIEF SUMMARY

Embodiments of the subject invention provide novel and advantageous systems, devices, and methods for measuring blood pressure without the use of a pump. A pumpless blood pressure measuring system or device can be wearable (e.g., on a user's wrist) for long periods of time (e.g., most or all of a day and even during sleep, if desired) comfortably. The pumpless blood pressure measuring system or device can include a body (which can include a display, such as a touch-screen display), at least one tension band connected to the body, at least one pressure sensor (e.g., pressure plate) configured to be in direct physical contact with the user's body (e.g., wrist area), and a tourniquet mechanism. The device can include two tension bands connected to either side of the body, or alternatively one tension band connected to one side of the body and a main band (non-tension band) connected to the other side of the body. The tourniquet mechanism can be tightened (e.g., by the user/wearer or by another such as a medical professional) to lead to artery occlusion such that the at least one pressure plate can determine the blood pressure of the user/wearer.

In an embodiment, a wearable device for measuring blood pressure without the use of a pump can comprise: a body comprising a display; and a band mechanism connected to the body. The band mechanism can comprise: a first band connected to a first side of the body; a second band connected to a second side of the body opposite from the first side; at least one pressure sensor, the at least one pressure sensor comprising a first pressure sensor connected to the first band; and a tourniquet mechanism connected to at least one of the first band and the second band. The tourniquet mechanism can be configured to tighten and loosen the band mechanism. At least one of the first band and the second band can be a tension band (e.g., the first band can be a tension band while the second band is a non-tension band, the first band can be a non-tension band while the second band is a tension band, or both the first and second bands can be tension bands). The wearable device can exclude a pump (i.e., no pump is present on the device at all). The tourniquet mechanism can comprise: a pinion shaft; a pinion gear connected to the pinion shaft; a rack having rack teeth and disposed such that the rack teeth interlock with pinion gear teeth of the pinion gear; a ratchet gear having ratchet gear teeth and disposed such that the ratchet gear teeth interlock with the pinion gear teeth of the pinion gear; and a ratchet lock configured to lock the ratchet gear in place. The tourniquet mechanism can further comprise a turning tool attached (e.g., removably attached or permanently attached) to the pinion shaft and configured to turn the pinion shaft in order to tighten the band mechanism. The tourniquet mechanism can further comprise a ratchet tool attached (e.g., removably attached or permanently attached) to the ratchet gear, the ratchet tool being configured to release the ratchet lock to release tension and thereby loosen the band mechanism (such as slowly loosen the band mechanism in the manner of how a blood pressure cuff is loosened when in use). The ratchet tool can be, for example, a button, a pin, or a rod. The at least one pressure sensor can further comprise a second pressure sensor connected to the second band. The first pressure sensor can be a first pressure plate and/or the second pressure sensor can be a second pressure plate. The wearable device can be configured to be worn, for example, around a wrist of a user of the wearable device. The wearable device can be, for example, a wrist watch (e.g., a smart watch); the wearable device can have any functionality found on wrist watches and/or smart watches. The body can further comprise a processor and a (non-transitory) machine-readable medium (e.g., a (non-transitory) computer-readable medium) in operable communication with the processor, the display being in operable communication with the processor, and the at least one pressure sensor being in operable communication with the processor (e.g., wirelessly (such as via Bluetooth) or in a wired way, such as a wire through at least one of the first band and the second band). The machine-readable medium can comprising instructions stored thereon that, when executed by the processor, perform the following steps: a) receiving (e.g., by the processor) an initial pressure reading from the at least pressure sensor; b) determining (e.g., by the processor), based on the initial pressure reading, if a predetermined pressure indicative of artery occlusion of a user of the wearable device has been reached; c1) if the predetermined pressure has not been reached, indicating (e.g., by the processor) to the user of the wearable device that the band mechanism should be tightened using the tourniquet mechanism, and then repeating steps a) and b); c2) if the predetermined pressure has been reached, indicating (e.g., by the processor) to the user of the wearable device that no further tightening of the band mechanism is required; d) receiving (e.g., by the processor) subsequent pressure readings from the at least one pressure sensor as the band mechanism is loosened; e) measuring (e.g., by the processor) a systolic blood pressure of the user of the wearable device based on the subsequent pressure readings; f) measuring (e.g., by the processor) a diastolic blood pressure of the user of the wearable device based on the subsequent pressure readings; and g) displaying (e.g., by the processor) the systolic blood pressure and the diastolic blood pressure on the display.

In another embodiment, a method for measuring blood pressure without the use of a pump can comprise: a) providing to a user a wearable device, the wearable device comprising any or all of the features described herein (e.g., any or all of the features described in the previous paragraph); b) receiving (e.g., by a processor of the body of the wearable device) an initial pressure reading from the at least pressure sensor; c) determining (e.g., by the processor), based on the initial pressure reading, if a predetermined pressure indicative of artery occlusion of the user of the wearable device has been reached; d1) if the predetermined pressure has not been reached, indicating (e.g., by the processor) to the user of the wearable device that the band mechanism should be tightened using the tourniquet mechanism, and then repeating steps b) and c) after the user has tightened the band mechanism using the tourniquet mechanism; d2) if the predetermined pressure has been reached, indicating (e.g., by the processor) to the user of the wearable device that no further tightening of the band mechanism is required and that tension in the band mechanism should be released using the tourniquet mechanism; e) receiving (e.g., by the processor) subsequent pressure readings from the at least one pressure sensor as the band mechanism is loosened after the user has released tension in the band mechanism using the tourniquet mechanism; f) measuring (e.g., by the processor) a systolic blood pressure of the user of the device based on the subsequent pressure readings; g) measuring (e.g., by the processor) a diastolic blood pressure of the user of the device based on the subsequent pressure readings; and h) displaying (e.g., by the processor) the systolic blood pressure and the diastolic blood pressure on the display. The indicating to the user of the wearable device that the band mechanism should be tightened using the tourniquet mechanism in step d1) can comprise, for example, an audible beep and/or displaying instructions on the display. The indicating to the user of the wearable device that no further tightening of the band mechanism is required and that tension in the band mechanism should be released using the tourniquet mechanism in step d2) can comprise, e.g., an audible beep (which can be different than the audible beep for step d1), if present) and/or displaying instructions on the display.

BRIEF DESCRIPTION OF DRAWINGS

FIG. 10C shows examples of gears that can be used with the tourniquet mechanism of a pumpless blood pressure measuring system, according to an embodiment of the subject invention. Though the left-hand portion of FIG. 10C lists certain dimensions, these are for exemplary purposes only and should not be construed as limiting.

FIG. 11B shows an angle from under the tourniquet mechanism while FIG. 11A shows an angle from above the tourniquet mechanism.

DETAILED DESCRIPTION

Embodiments of the subject invention provide novel and advantageous systems, devices, and methods for measuring blood pressure without the use of a pump. A pumpless blood pressure measuring system or device can be wearable (e.g., on a user's wrist) for long periods of time (e.g., most or all of a day and even during sleep, if desired) comfortably. The pumpless blood pressure measuring system or device can include a body (which can include a display, such as a touch-screen display), at least one tension band connected to the body, at least one pressure sensor (e.g., pressure plate) configured to be in direct physical contact with the user's body (e.g., wrist area), and a tourniquet mechanism. The device can include two tension bands connected to either side of the body, or alternatively one tension band connected to one side of the body and a main band (non-tension band) connected to the other side of the body. The tourniquet mechanism can be tightened (e.g., by the user/wearer or by another such as a medical professional) to lead to artery occlusion such that the at least one pressure plate can determine the blood pressure of the user/wearer.

In the related art, it is thought that wearable blood pressure measuring systems are expensive and not as effective as larger more cumbersome standard devices. Also, new systems take time to design, build, and test from benchtop to get to the point of serving a target population. Photoplethysmography (PPG)-based approaches have been considered by measuring pulse transit of PPG shape and using artificial intelligence (AI). The heterogeneity of population body type, pathologies, and pharmaceutical regiments make the task of PPG interpretation extremely complex.

Embodiments of the subject invention provide a complementary approach to the measurement of blood pressure with a pumpless, wearable, mechanical blood pressure measuring device (e.g., a cuff) that can reduce the cost of wearable devices. The device can provide blood pressure measurements instantaneously or on demand and can be a patient-activated blood pressure monitoring system, which can be particularly useful for portions of the population with less access to medical care. The cuff approach is simplified while also decreasing cost and increasing ease of use.

Figure 1:
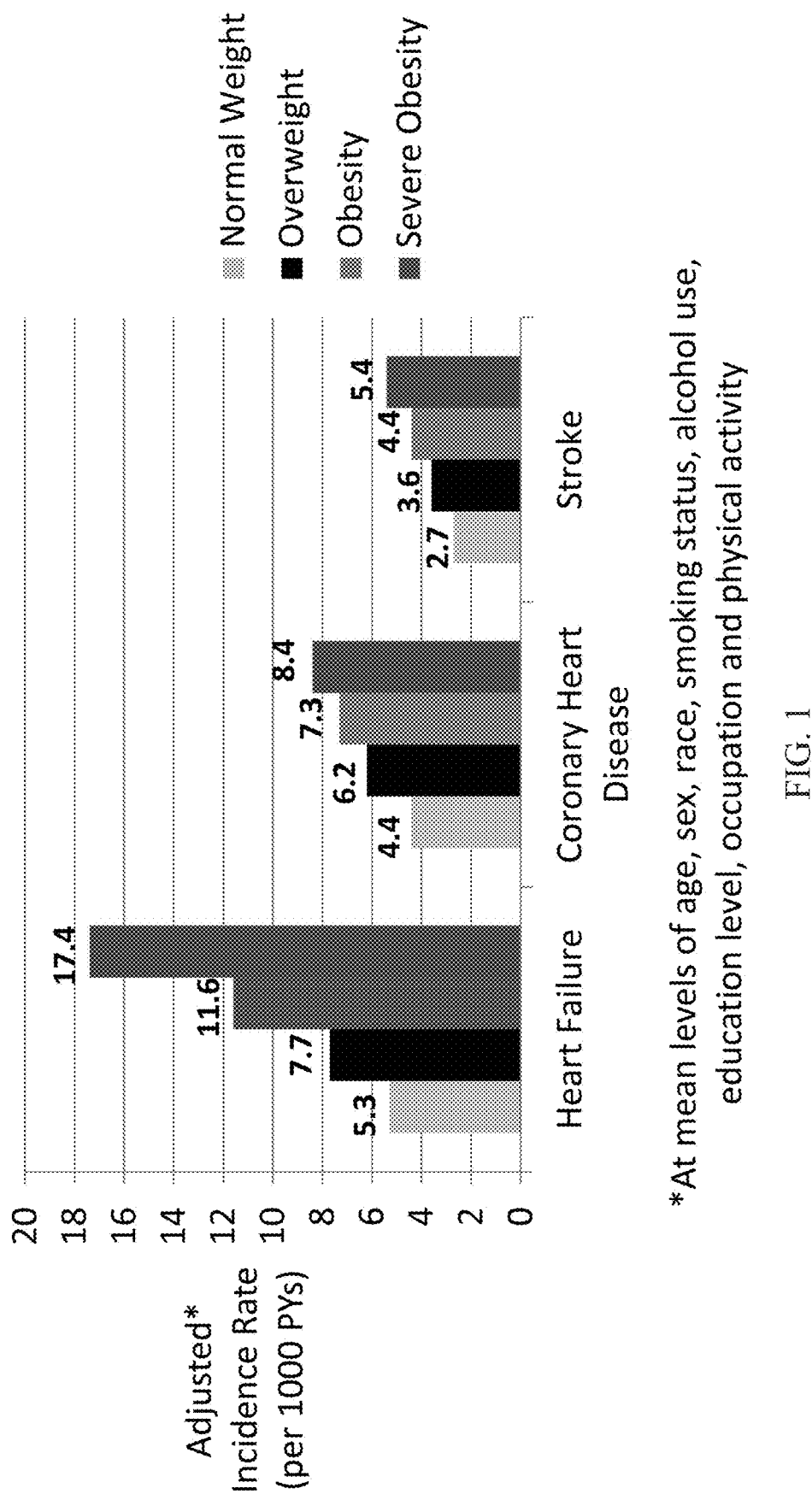
FIG. 1 shows a graph of hear failure, coronary heart disease, and stroke rates (per 1000 people) for those with normal weight, those who are overweight, those with obesity, and those with severe obesity.
Figure 2:
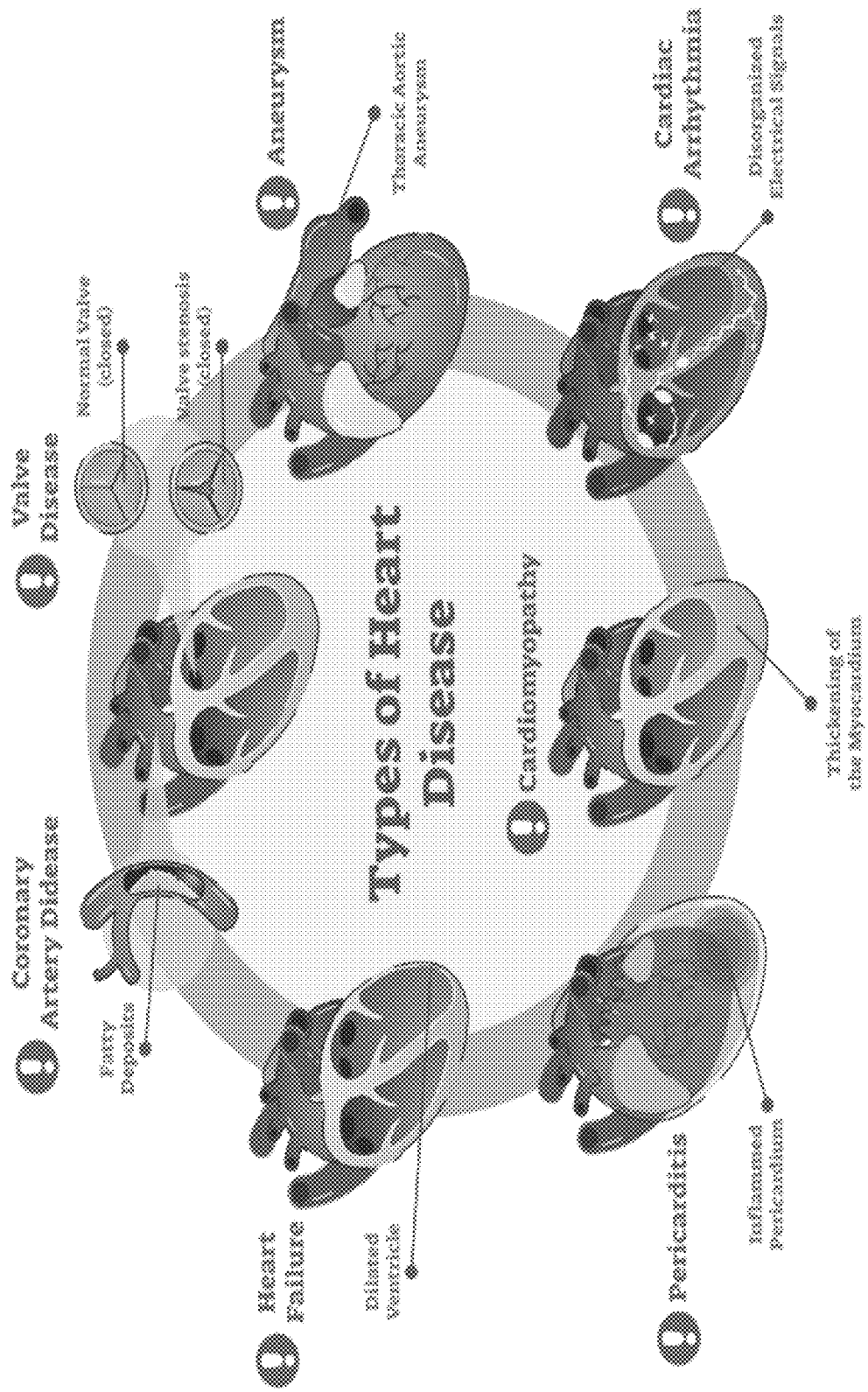
FIG. 2 shows an illustration of different types of heart disease.
Figure 3:
FIG. 3 shows a top view of a pumpless blood pressure measuring system, according to an embodiment of the subject invention.
Figure 4:
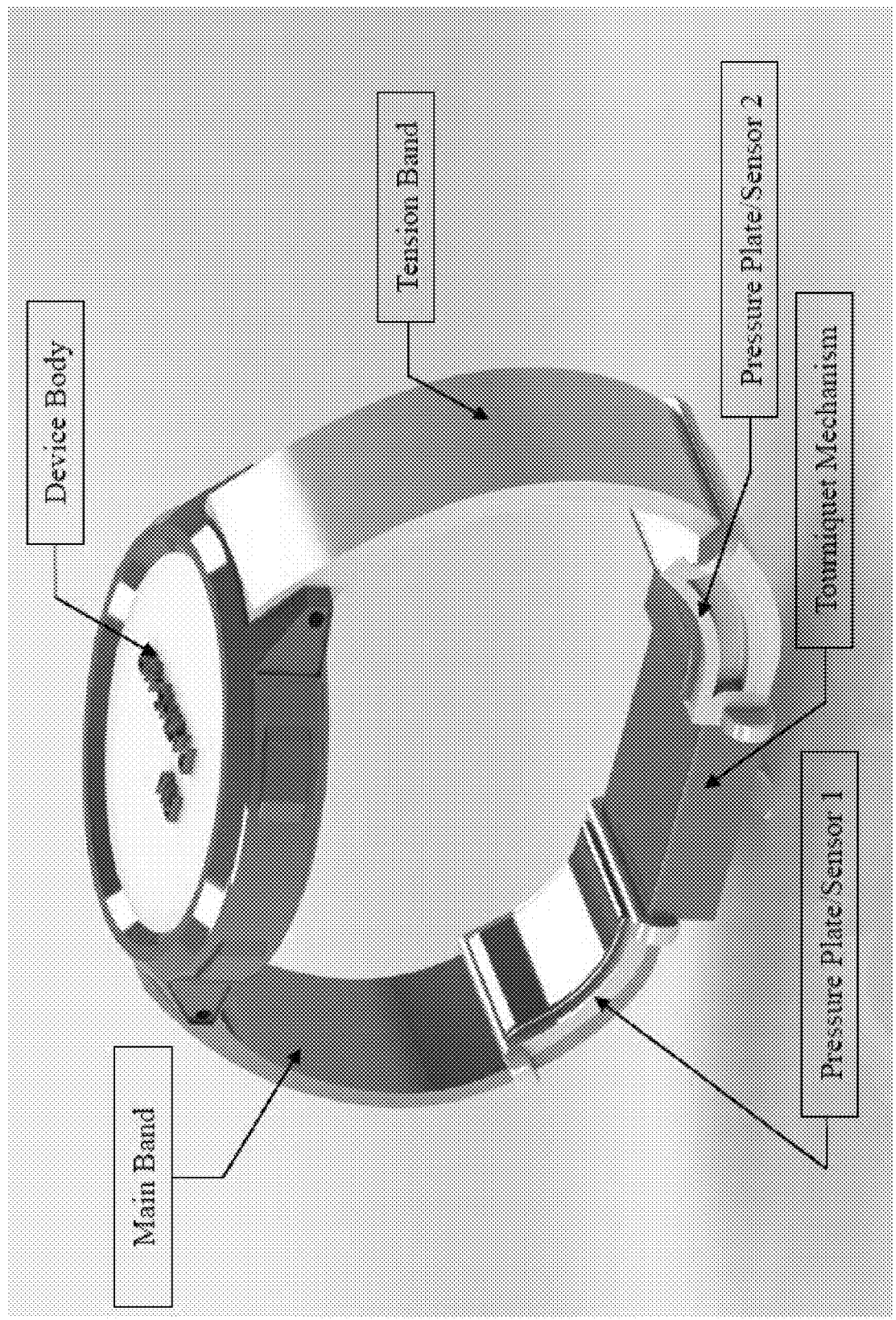
FIG. 4 shows a perspective view of a pumpless blood pressure measuring system, according to an embodiment of the subject invention.
Figure 5:
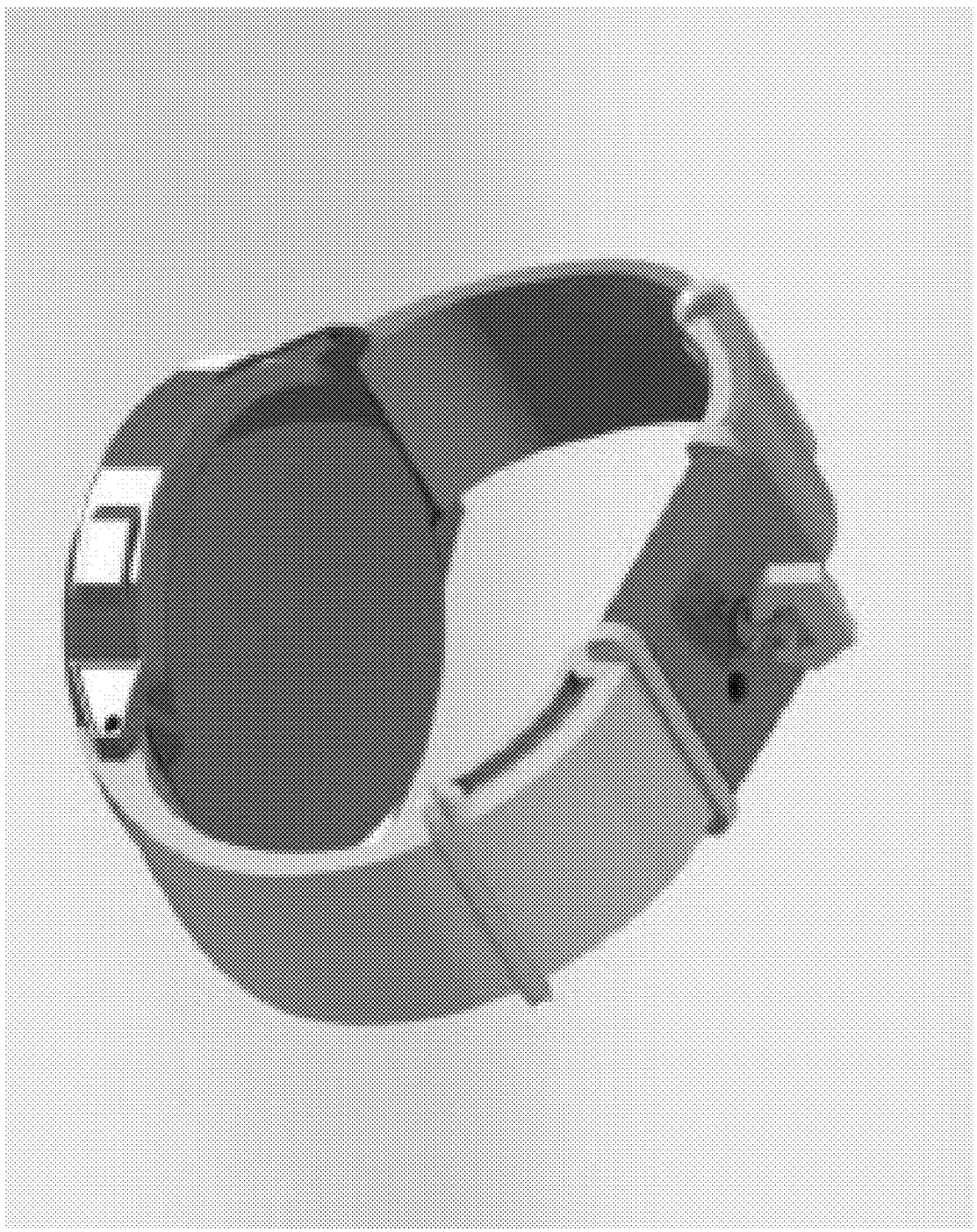
FIG. 5 shows a perspective view of a pumpless blood pressure measuring system, according to an embodiment of the subject invention.
Figure 6:
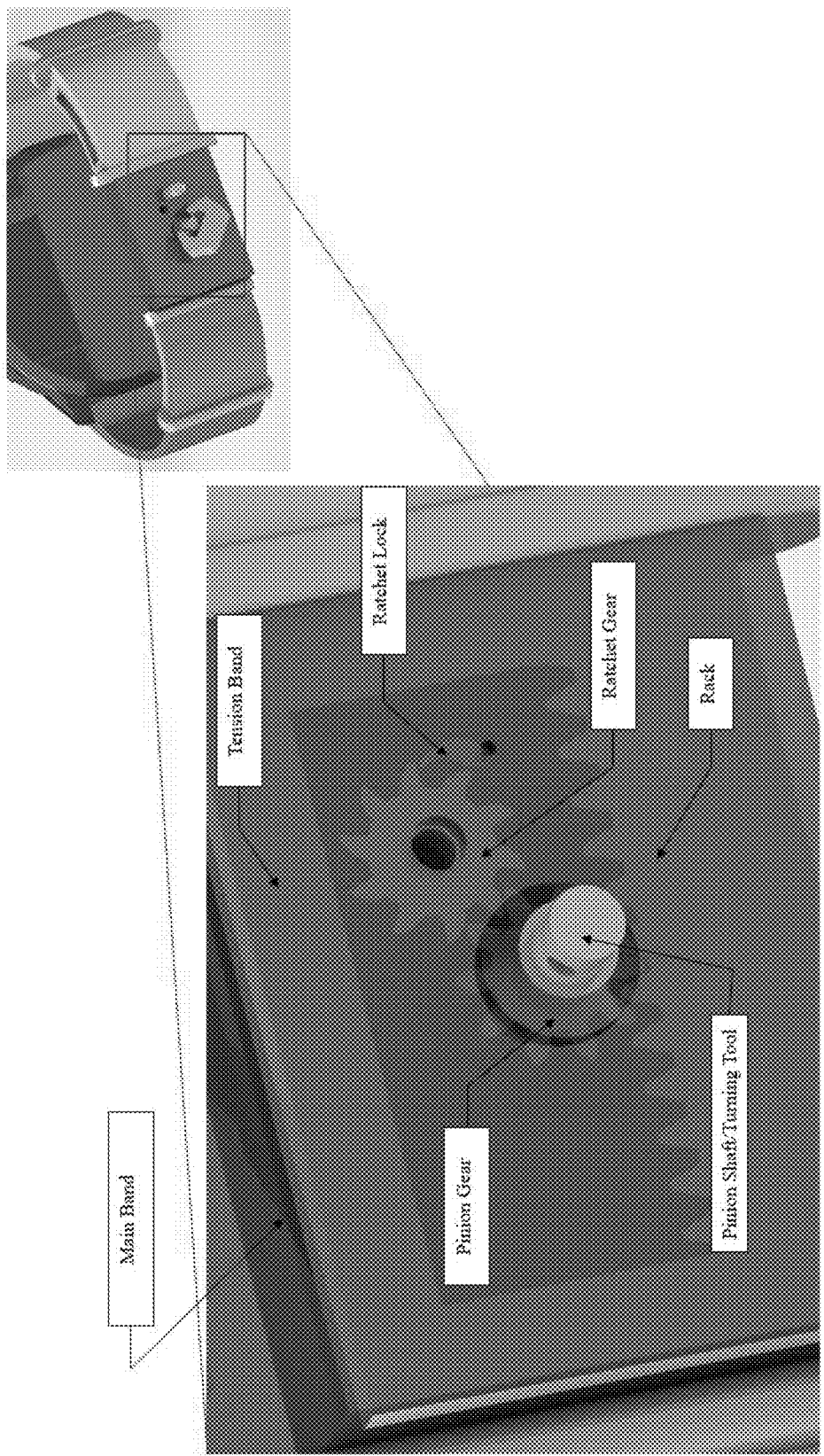
FIG. 6 shows a perspective view of a tourniquet mechanism of a pumpless blood pressure measuring system, according to an embodiment of the subject invention. The upper-right-hand portion of FIG. 6 shows the location of the tourniquet mechanism at a lower portion of the pumpless blood pressure measuring system, and the remainder of FIG. 6 shows an enlarged view of the tourniquet system indicated by the box in the upper-right-hand portion of the figure.
Figure 13:
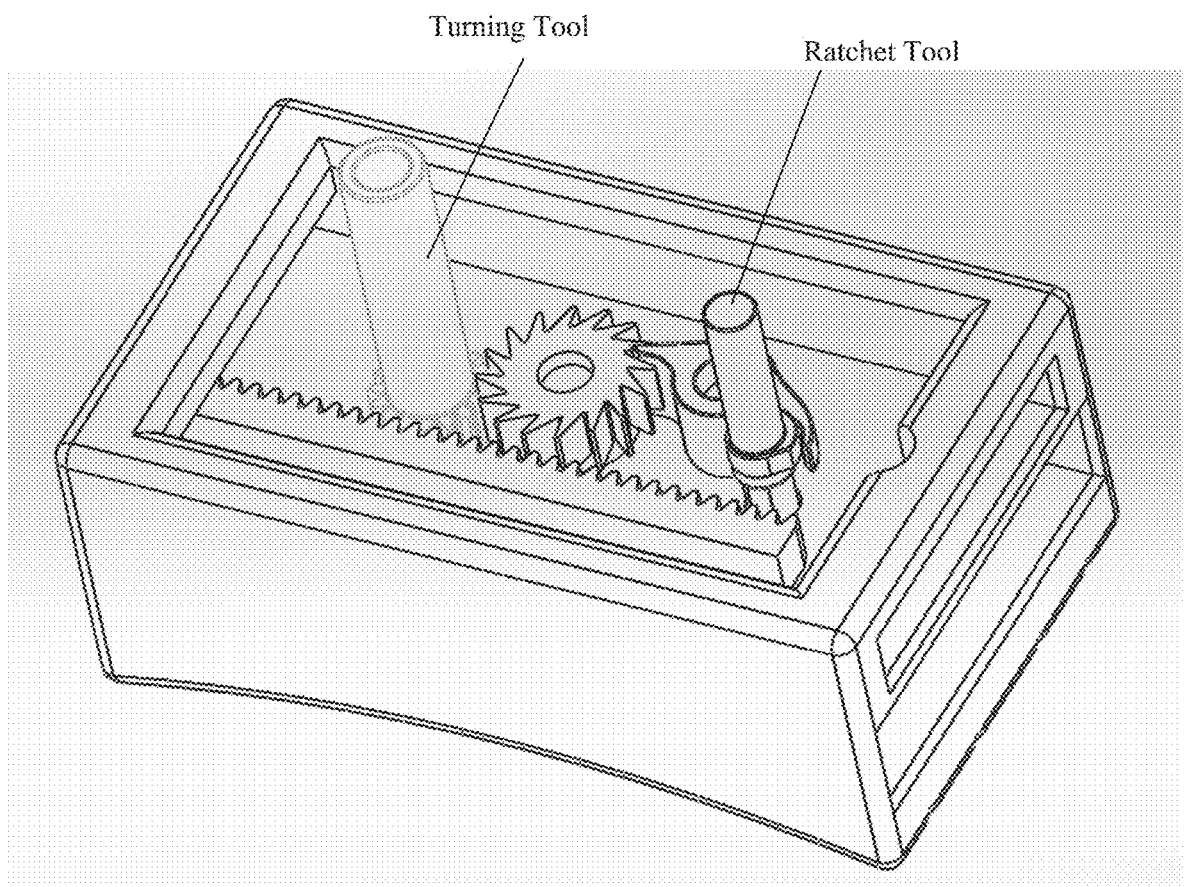
FIG. 13 shows an image of a pumpless blood pressure measuring system, according to an embodiment of the subject invention.

FIGS. 3-5 show various views of a pumpless blood pressure measuring system/device, according to an embodiment of the subject invention; FIG. 6 shows a detailed view of the tourniquet mechanism; and FIG. 13 shows an image of a pumpless blood pressure measuring system/device, according to an embodiment of the subject invention. Referring to FIGS. 3-5 and 13, the pumpless blood pressure measuring system/device can include a body, a first band connected to a first side of the body, a second band connected to a second side of the body opposite from the first side, a first pressure sensor (e.g., a pressure plate) connected to the first band, and a tourniquet mechanism connected to the second band and/or the first pressure sensor. The device can further include a second pressure sensor (e.g., a pressure plate) connected to the first band. The first band can be a main band (non-tension band) or a tension band configured to provide tension when the tourniquet mechanism is used, and the second band is a tension band. The body can include a display (e.g., a touch-screen display). The body can also include a processor, a (non-transitory) machine-readable medium having instructions and/or software stored thereon for controlling the pressure sensor(s) and the display, and/or other circuit elements for the functioning of the device. The device can include other functionality (e.g., any functionality typically found on wrist watches and/or smart watches), such as the ability to tell the time, and/or the ability to connect (e.g., wirelessly such as via Bluetooth) to (other) smart devices (e.g., smart phone, smart tablet). The device can be configured to be wearable, for example on a user's wrist. Though a watch-like device is shown in FIGS. 3-5, this is for exemplary purposes only and should not be construed as limiting.

Referring to FIG. 6, the tourniquet mechanism can include a pinion shaft, a pinion gear, a rack, a ratchet gear, and a ratchet lock. That is, the tourniquet mechanism can have a rack and pinion gear mechanism with ratchet locking and release. This allows for manual tightening of the bands (e.g., wrist straps). The tourniquet mechanism can be in direct, physical contact with the second band (i.e., tension band). The pinion shaft can have a turning tool attached thereto (e.g., removably attached thereto) for turning the pinion shaft to tighten the bands. The ratchet can have a button, pin, or similar tool attached thereto (e.g., removably attached thereto) for manually releasing the tension (e.g., by pressing the button, pin, or similar tool to release the ratchet lock). The tourniquet mechanism can be tightened (e.g., by the user/wearer or by another such as a medical professional) to lead to artery occlusion such that the at least one pressure plate can determine the blood pressure of the user/wearer.

Figure 12:
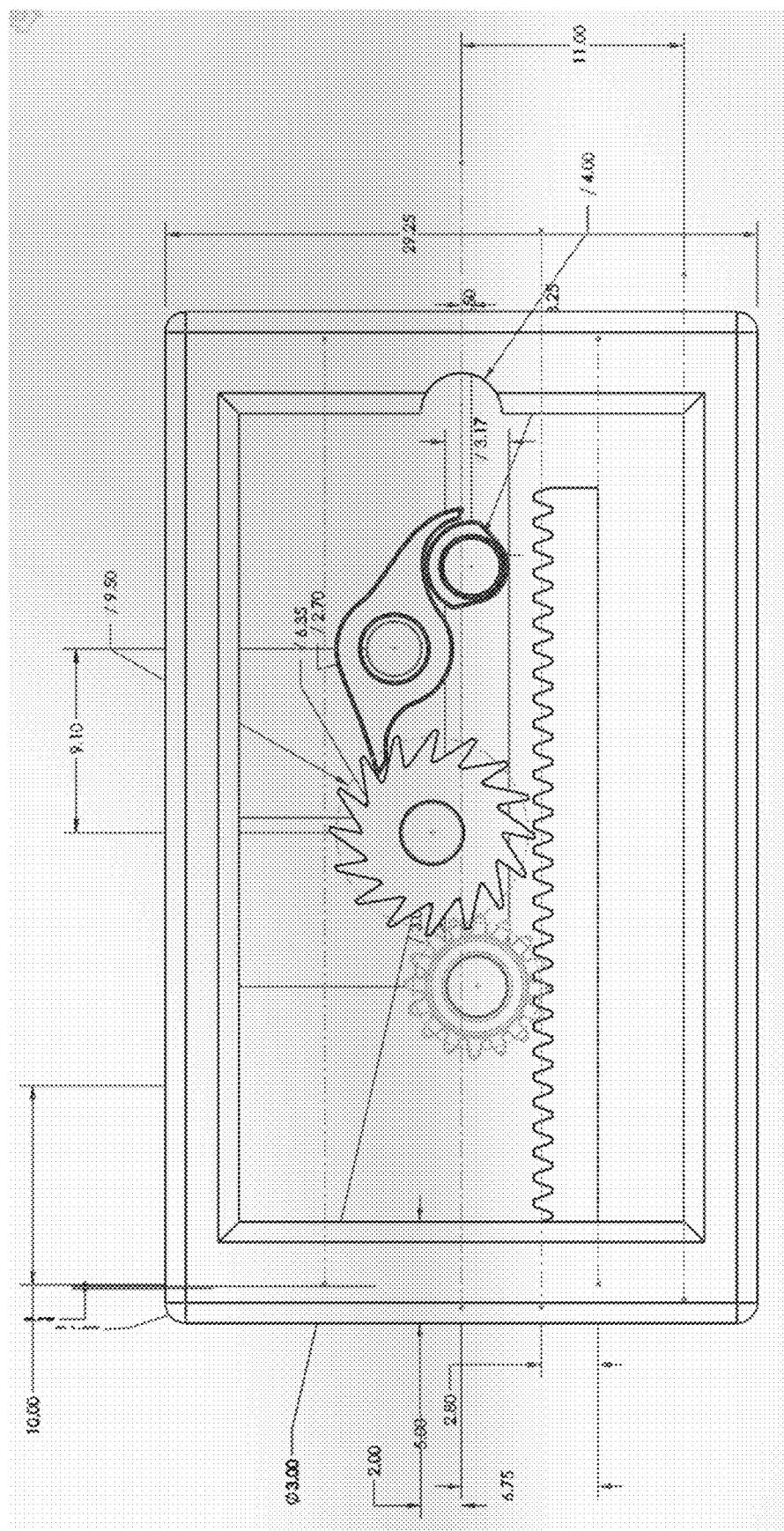
FIG. 12 shows a schematic view of a tourniquet mechanism of a pumpless blood pressure measuring system, according to an embodiment of the subject invention.

FIG. 12 shows a schematic view of a tourniquet mechanism of a pumpless blood pressure measuring system, according to an embodiment of the subject invention. FIG. 12 shows certain dimensions (all numerical values are in millimeters (mm)) for exemplary purposes. The dimensions listed in FIG. 12 should not be construed as limiting. For example, any of the dimensions can be +/−30% of the values listed in FIG. 12, though embodiments are not limited thereto.

Figure 7:
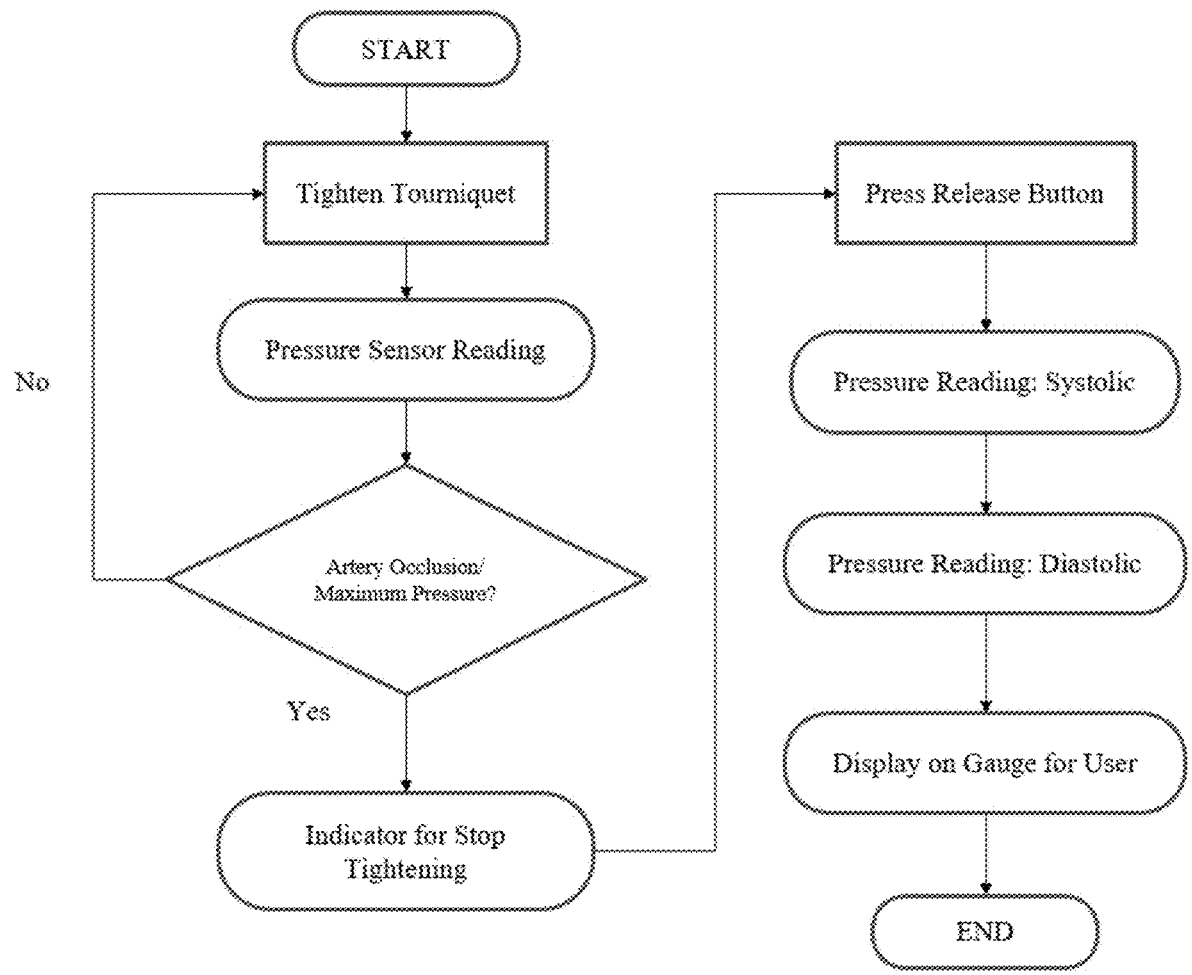
FIG. 7 shows a flow chart of a method for using a pumpless blood pressure measuring system to measure blood pressure, according to an embodiment of the subject invention.

Referring to FIG. 7, a method for measuring blood pressure using a pumpless system/device as disclosed herein can comprise: tightening the tourniquet mechanism; allowing the pressure sensor(s) to take a reading; determining (e.g., by the processor in the body) if artery occlusion and/or maximum desired pressure has been reached; if no, then communicating that to the user so the tourniquet mechanism can be further tightened before repeating the reading and determining; if yes, then providing an indication (e.g., on the display and/or using an audible alert) to stop tightening the tourniquet mechanism; pressing the release button (attached to the ratchet) to slowly release the tension so the pressure sensor(s) can measure arterial blood pressure of the user; measuring, by the pressure sensor(s) the systolic blood pressure; measuring, by the pressure sensor(s) the diastolic blood pressure; and displaying the blood pressure results on the display.

Embodiments of the subject invention can utilize a pumpless mechanical arterial compression mechanism to achieve arterial occlusion as a core of the oscillatory method. The low-cost nature of the system means that only low-cost and off-the-shelf components may be required. With the design revolving around a pumpless mechanism to create the arterial occlusion, the device eliminates the need for a motorized electric pump to inflate a cuff. In certain embodiments, electrical components can be limited to the sensing feature(s) of the device, used to measure and indicate to the user either their instantaneous blood pressure or blood pressure range at the time of measurement. Mechanical occlusion of the artery (e.g., at the wrist) can be facilitated by the use of the tourniquet mechanism built into the band(s). The device can allow the user to measure and monitor instantaneous blood pressure at any time desired throughout the day without using a brachial cuff and/or a tabletop system. The tourniquet approach also eliminates the need for a pump and its associated batteries, reducing cost and encumbrance. The system interface and data interpretation can be built into the user interface and can monitor and/or keep track of the user's current blood pressure range, which can be indicated by a scale based on the user's previously recorded pressure compared to their current state.

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

Figure 8A:
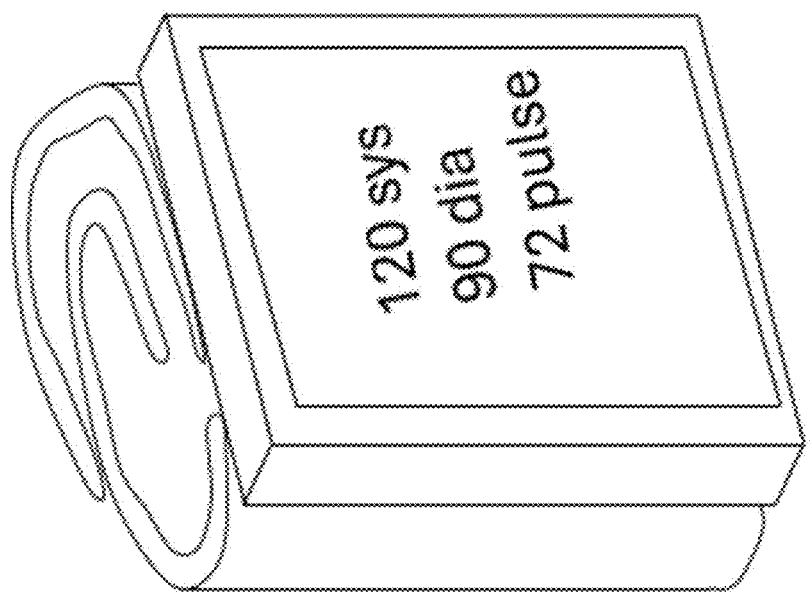
FIG. 8A shows an image of a commercial wrist cuff blood pressure measuring system.
Figure 8B:
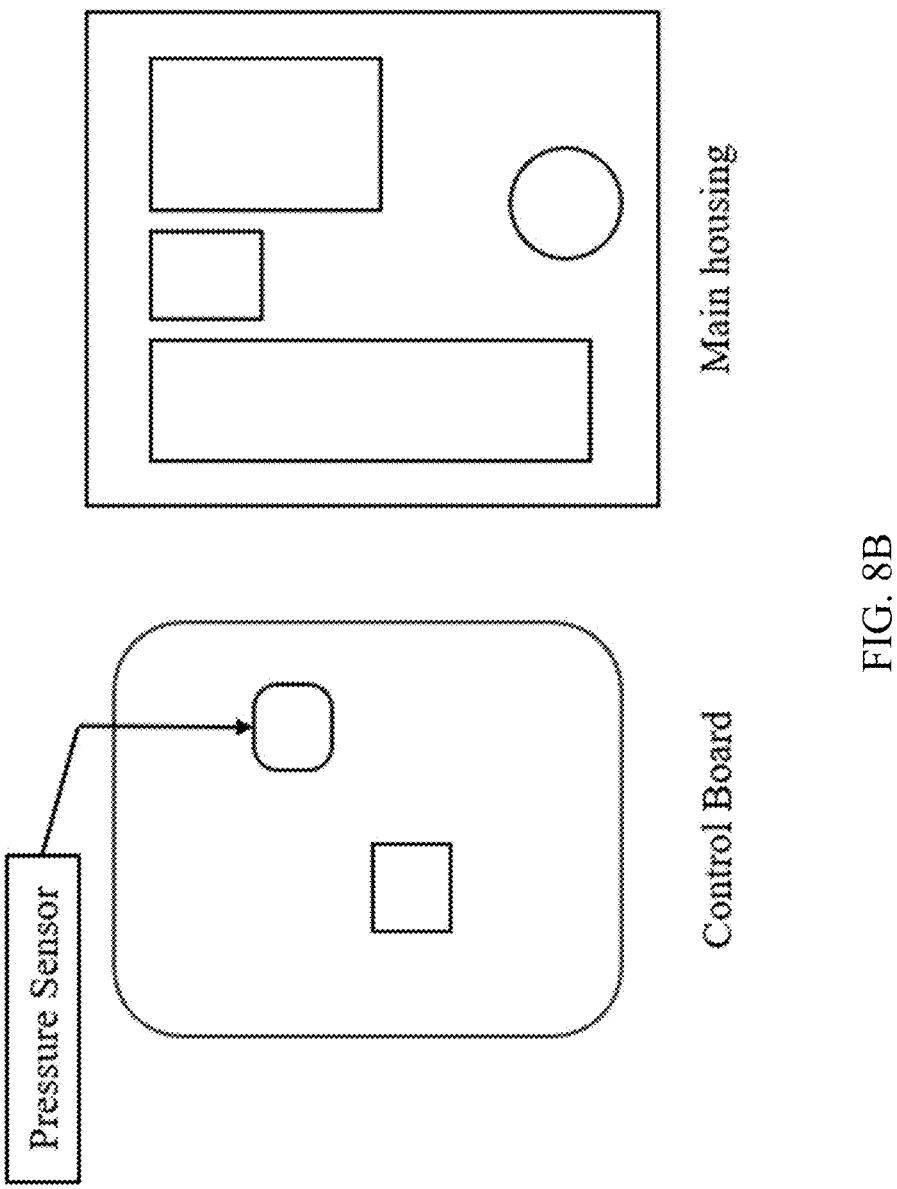
FIG. 8B shows an image of the interior of the blood pressure measuring system of FIG. 8A.
Figure 8C:
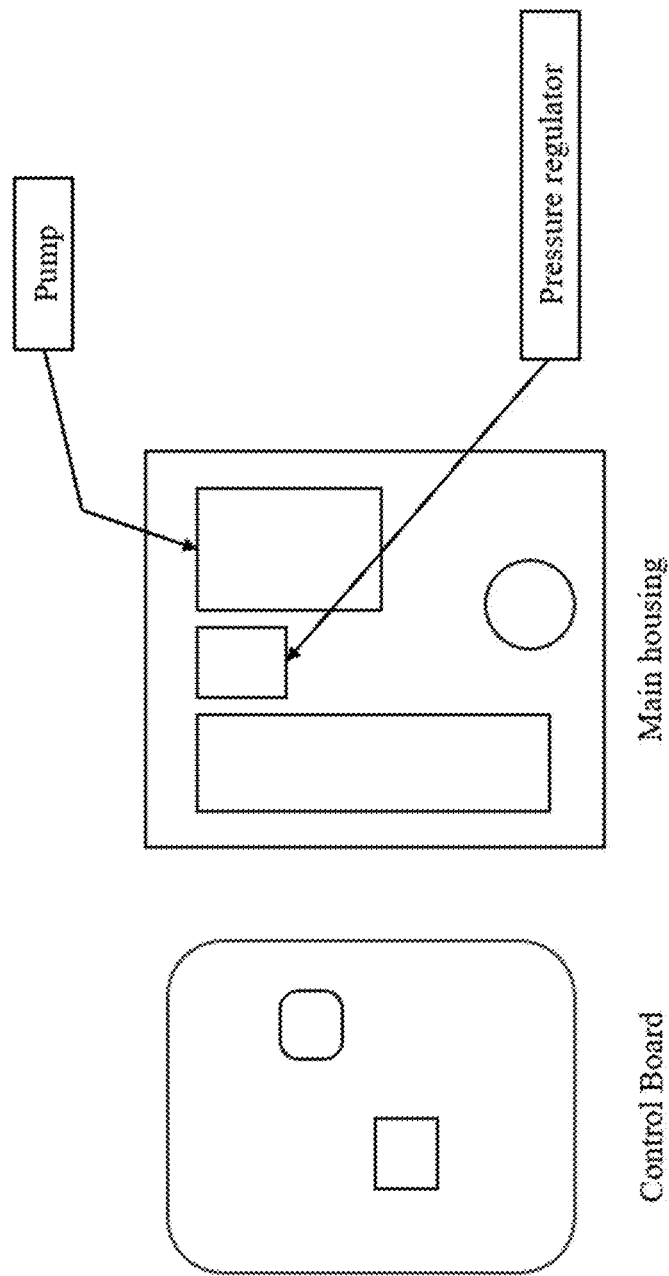
FIG. 8C shows an image of the interior of the blood pressure measuring system of FIG. 8A.
Figure 8D:
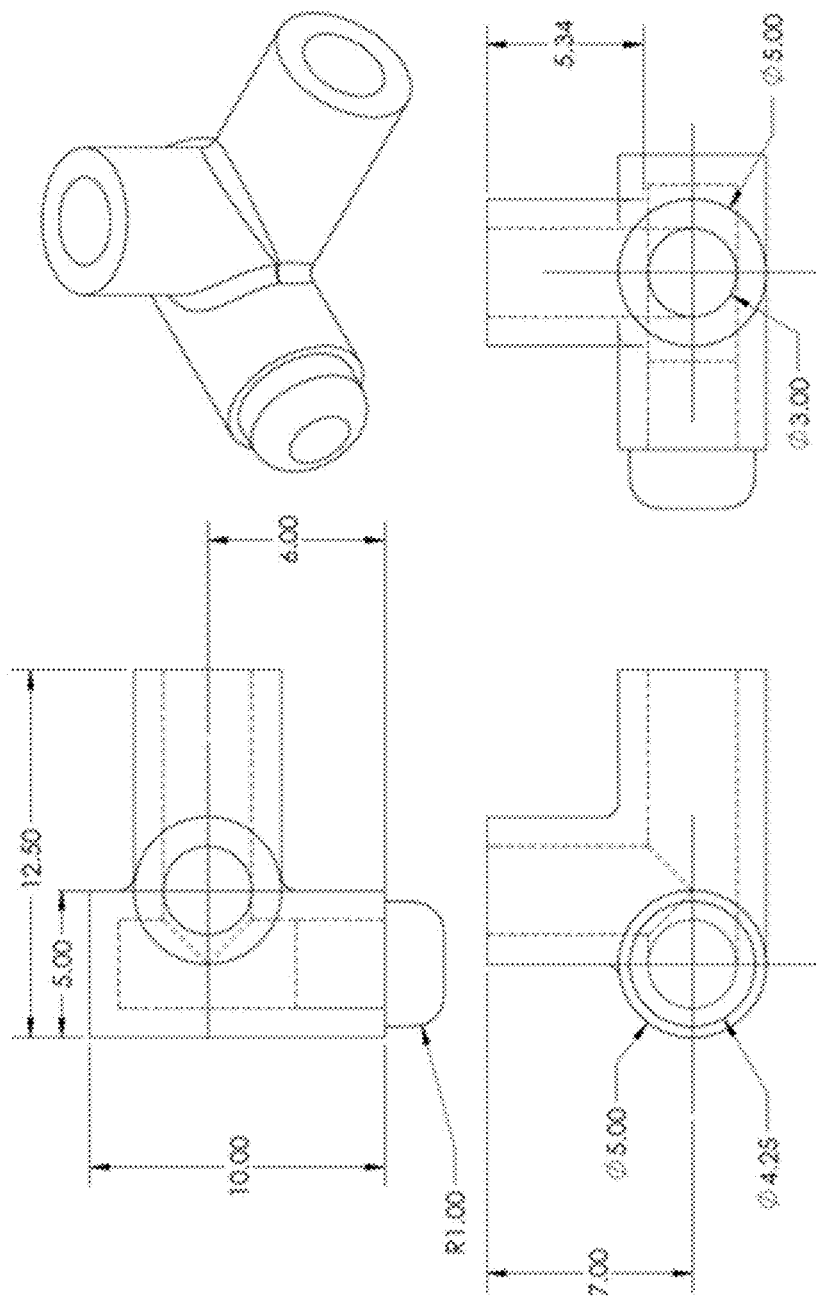
FIG. 8D shows an image of the pressure line extension adaptor head from the interior of the blood pressure measuring system of FIG. 8A.
Figure 8E:
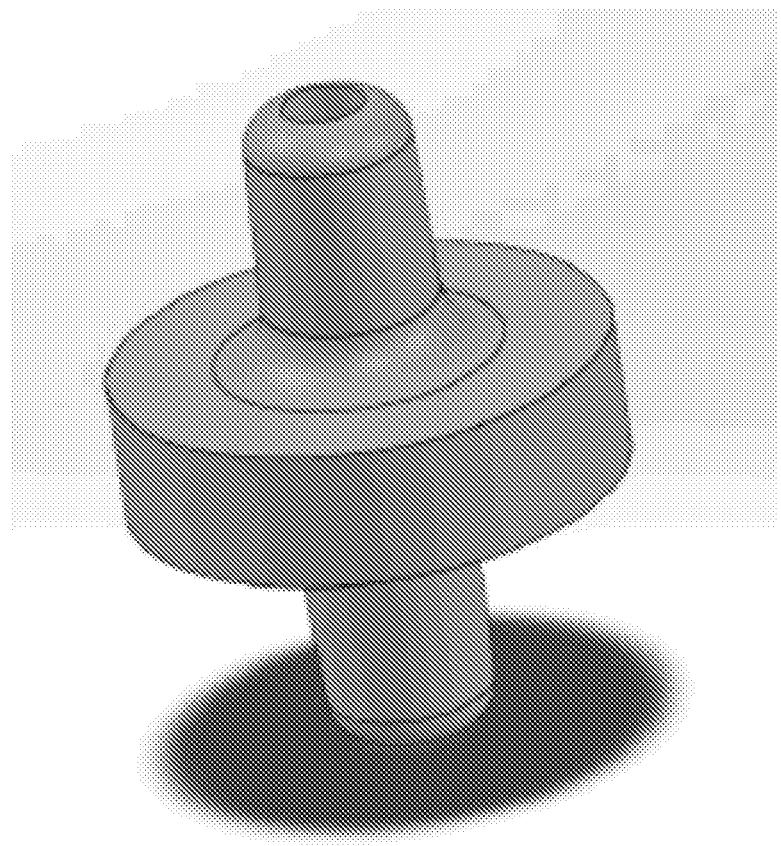
FIG. 8E shows a schematic view of the pressure line extension adaptor head shown in FIG. 8D.

A commercial wrist system was torn down to retrieve certain components. FIGS. 8A-8D show images of the exterior and interior of the commercial wrist system, and FIG. 8E shows a schematic of the pressure line extension adaptor head from the commercial wrist system.

A benchtop prototype system was constructed using tension bands as well as certain off-the-shelf-type components from the commercial wrist system. FIGS. 9A-9F show images of the benchtop prototype system.

Figure 9A:
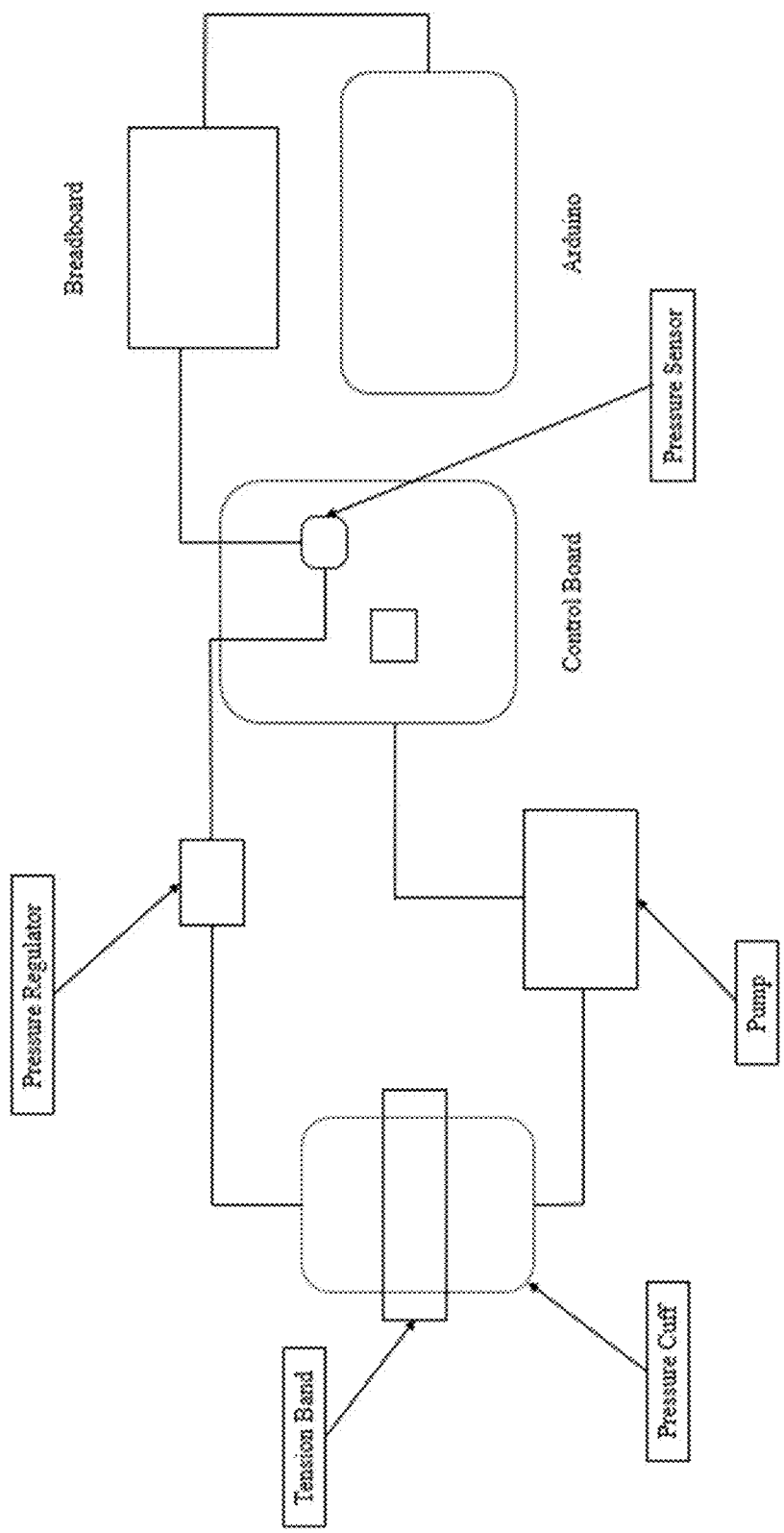
FIG. 9A shows an image of a pumpless blood pressure measuring system, according to an embodiment of the subject invention, using certain parts from the system of FIG. 8A. This system is for testing and exemplary purposes only and should not be construed as limiting.
Figure 9B:
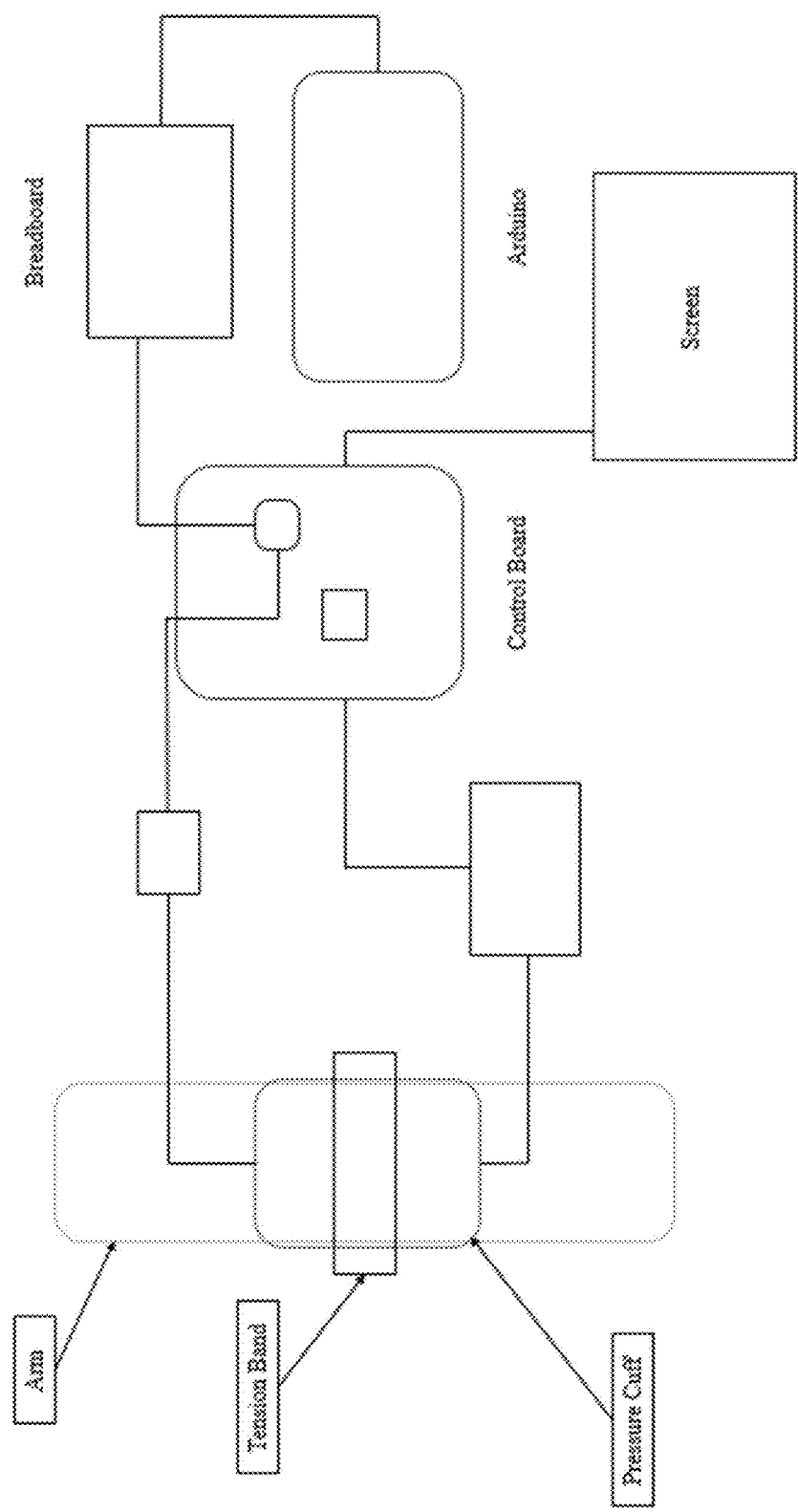
FIG. 9B shows an image of the pumpless blood pressure measuring system of FIG. 9A on a user's wrist.
Figure 9C:
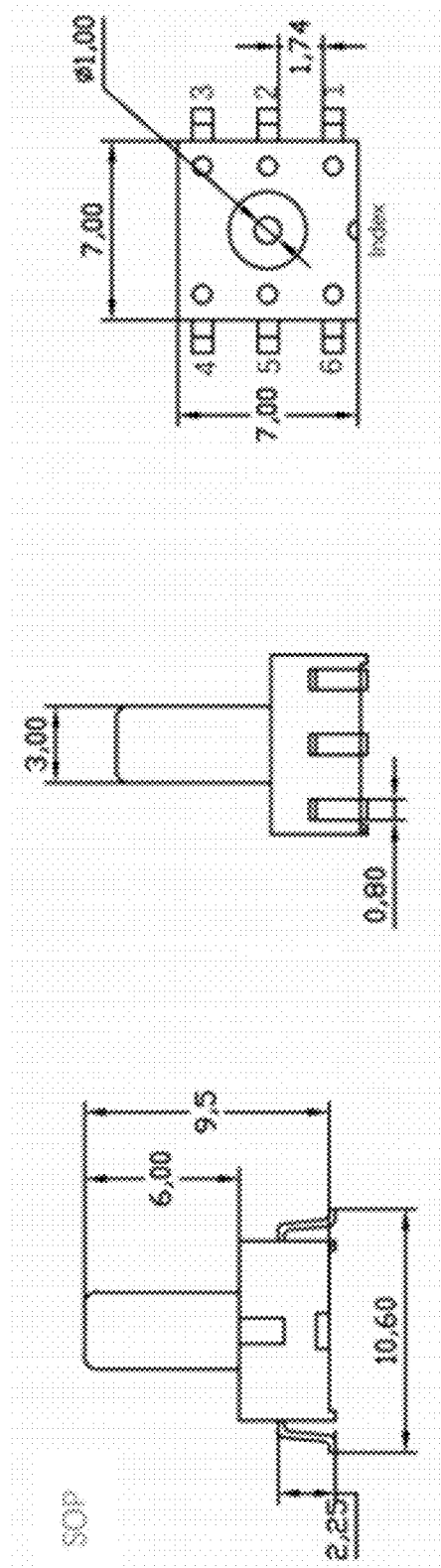
FIG. 9C shows an image of a circuit element that can be used with the pumpless blood pressure measuring system of FIG. 9A.
Figure 9D:
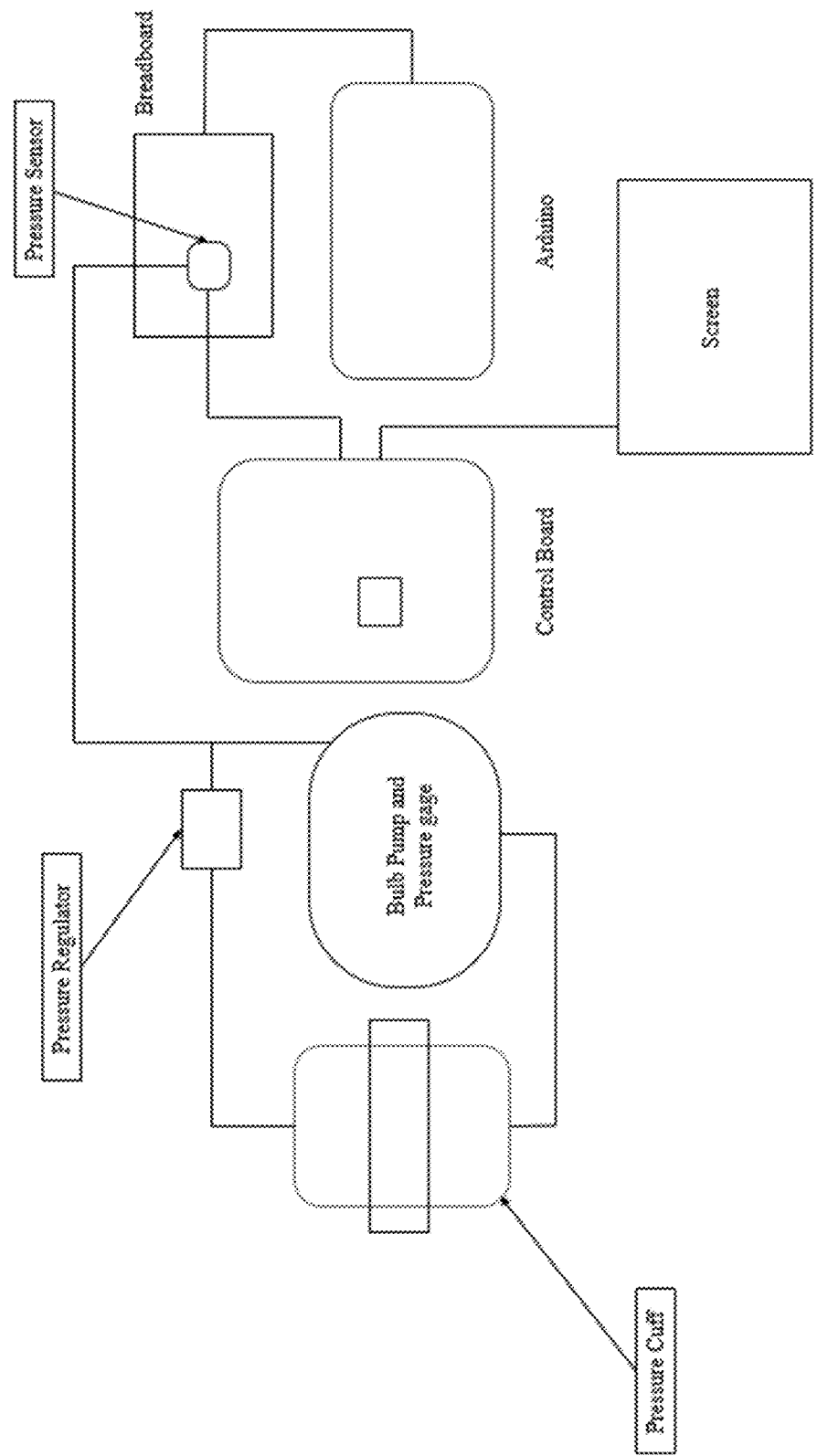
FIG. 9D shows another image of the pumpless blood pressure measuring system of FIG. 9A.
Figure 9E:
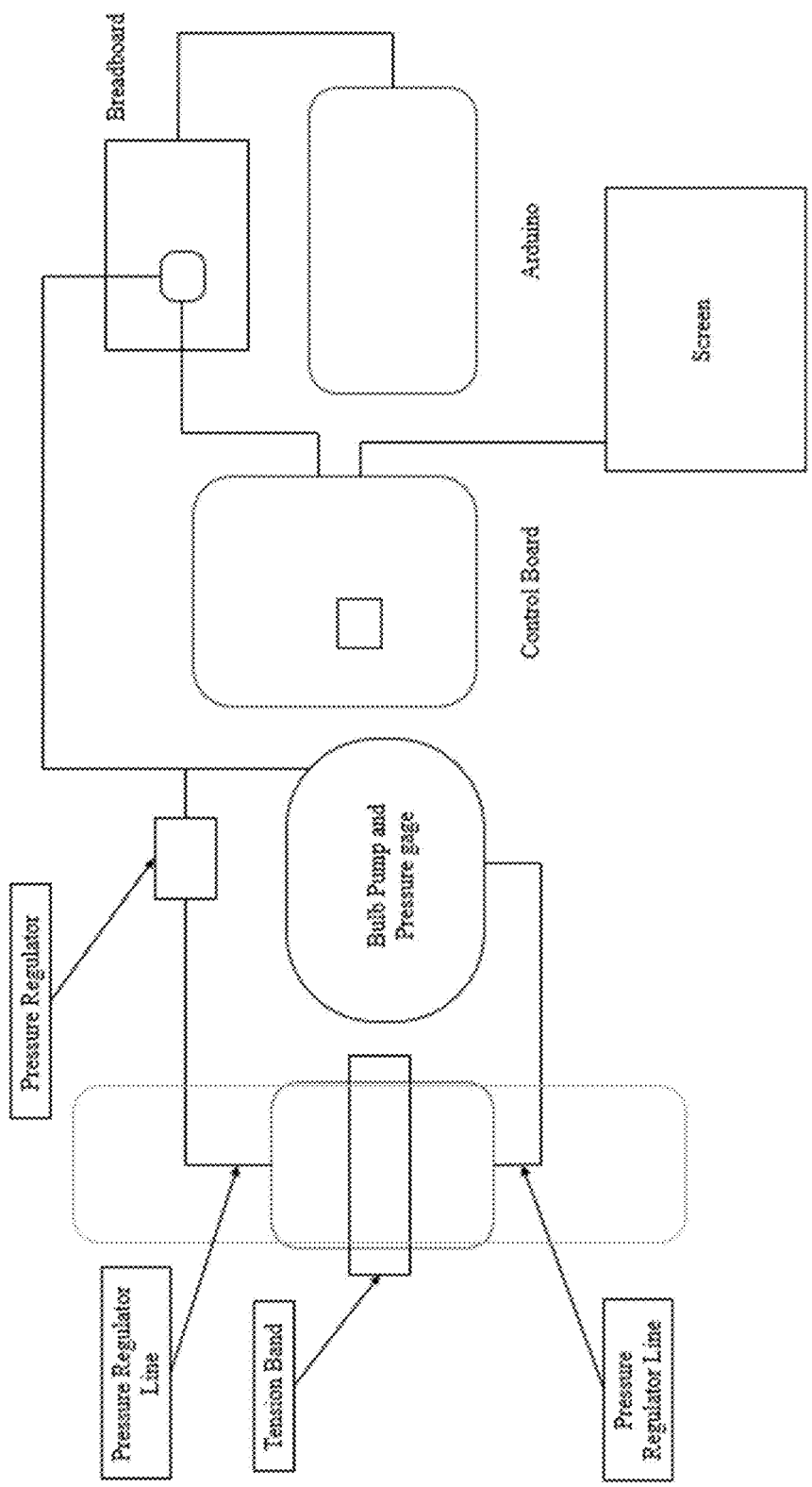
FIG. 9E shows an image of the pumpless blood pressure measuring system of FIG. 9A on a user's wrist.
Figure 9F:
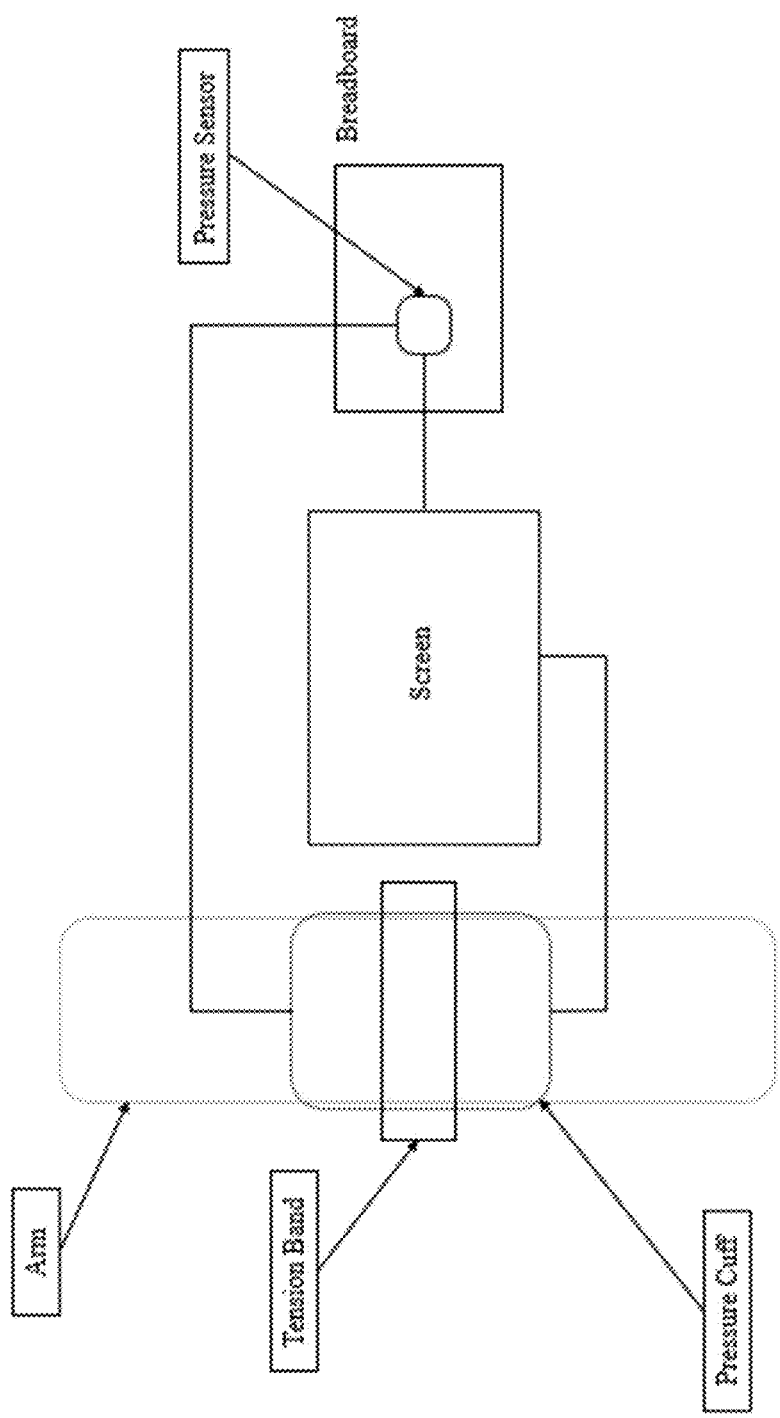
FIG. 9F shows an image of the pumpless blood pressure measuring system of FIG. 9A on a user's wrist.

The tensioning band pressurization technique was successfully tested. Then, the pump system was removed, and the tourniquet method with base measurement board was implemented (this is shown in FIG. 9F). Pressurization and depressurization was successfully achieved with a preprogramed board system.

Example 2

Figure 10A:
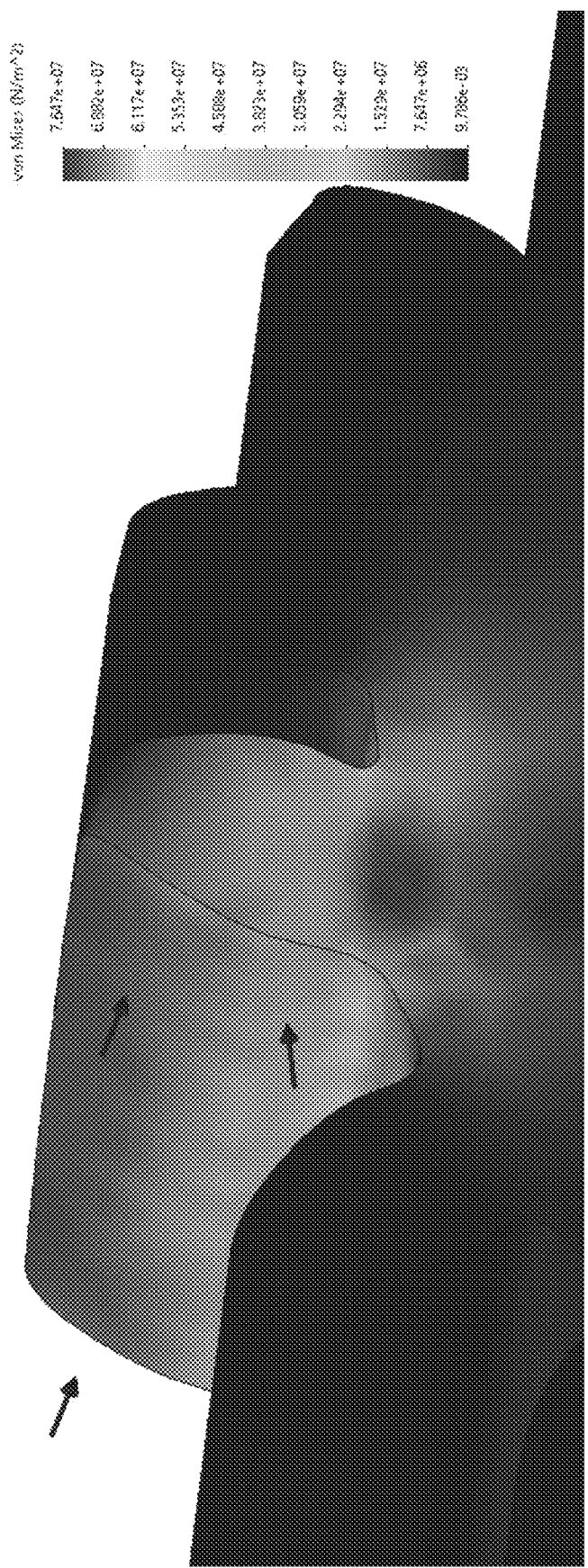
FIG. 10A shows an analysis of pressure (in Newtons per square meter ($N/m^2$) on a gear used in the tourniquet mechanism of a pumpless blood pressure measuring system, according to an embodiment of the subject invention.
Figure 10B:
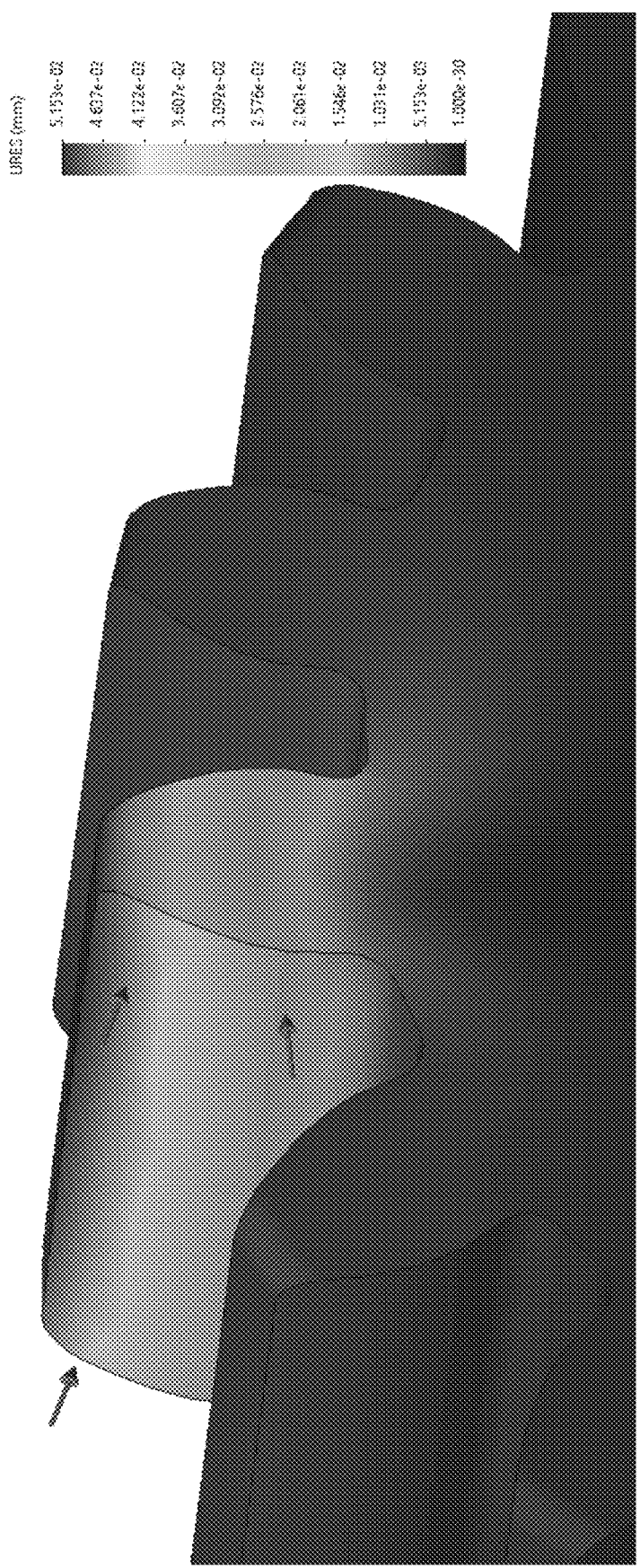
FIG. 10B shows an analysis of pressure (in Newtons per square meter ($N/m^2$) on a gear used in the tourniquet mechanism of a pumpless blood pressure measuring system, according to an embodiment of the subject invention.

The tourniquet mechanism was simulated to determine the pressure acting on teeth of the gears. A gear strength analysis was performed, with different materials simulated including polylactic acid (PLA, with shear stress in the y-direction ($\sigma_y$) of about 60 megaPascals (MPa)), acrylonitrile butadiene styrene ($\sigma_y$ of about 40 MPa), steel ($\sigma_y$ of about 350 MPa), and aluminum ($\sigma_y$ of about 270 MPa). The results are shown in FIGS. 10A and 10B. Though a gear with one mod of 17 teeth with certain dimensions (in mm) is shown in FIG. 10C, this is for exemplary purposes only and should not be construed as limiting.

Example 3

Figure 11A:
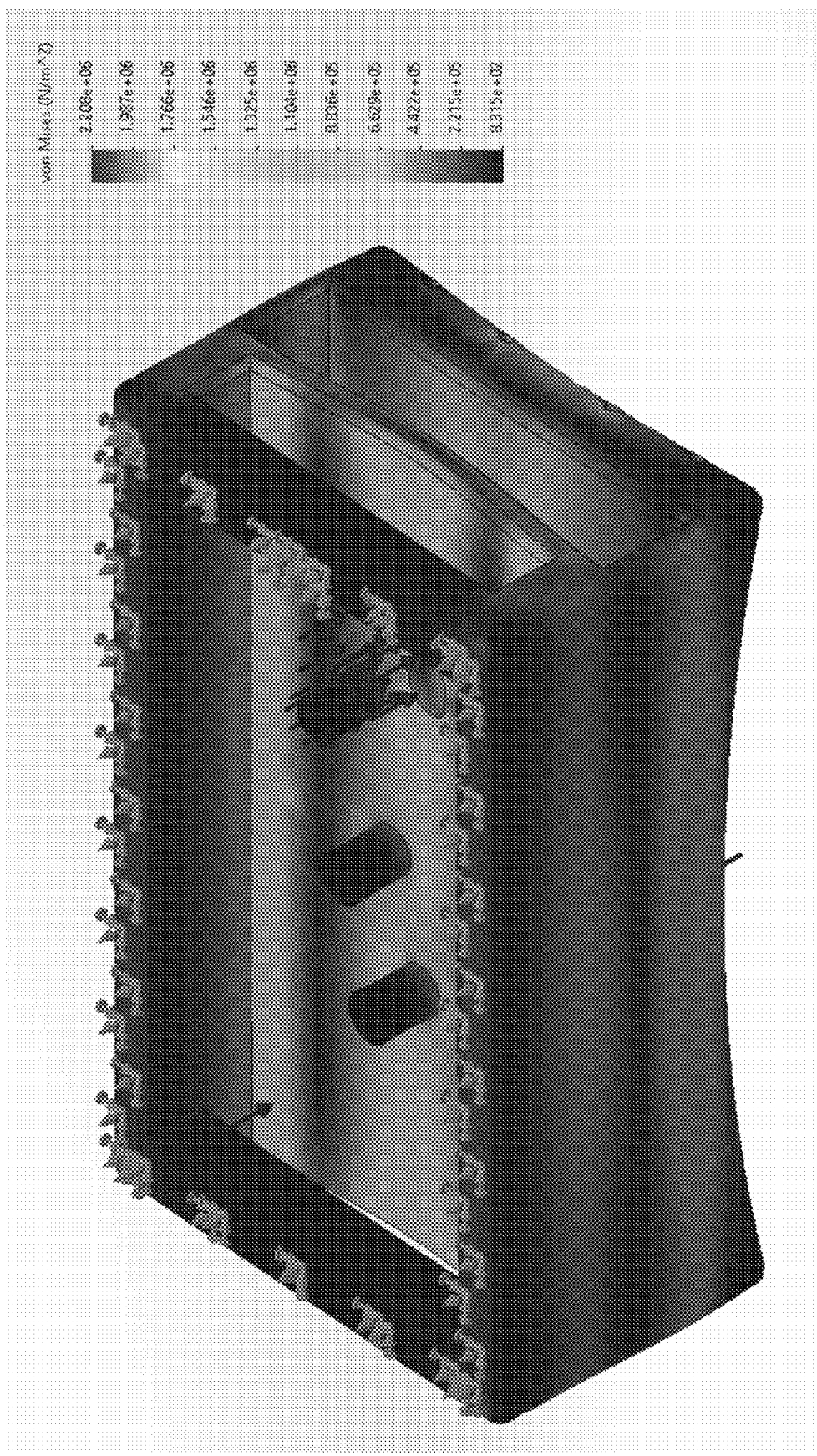
FIG. 11A shows a finite element analysis (FEA) of stress in a tourniquet mechanism under a load.
Figure 11B:
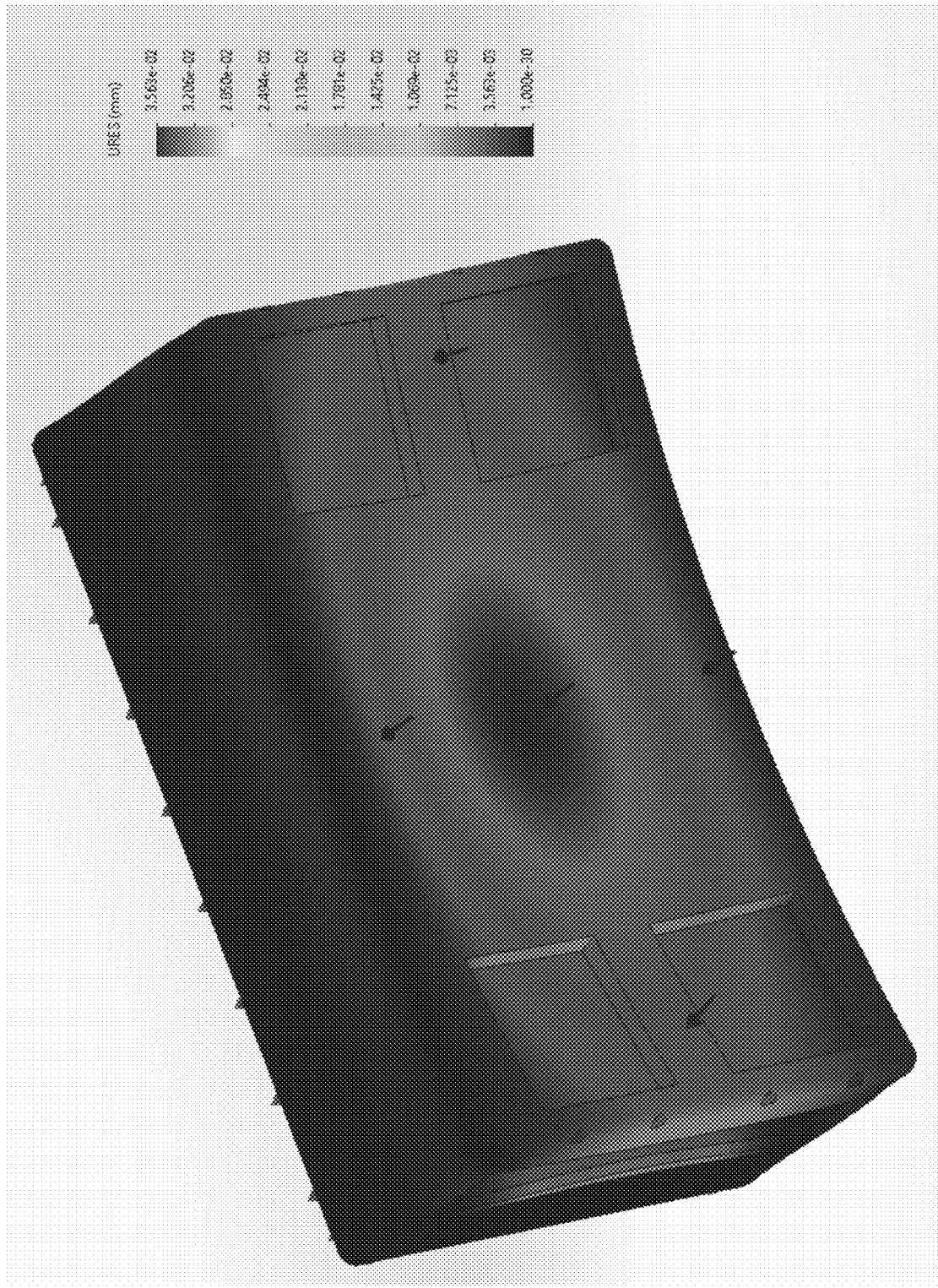
FIG. 11B shows an FEA of stress in the tourniquet mechanism under the same load as in FIG. 11A.

A pumpless blood pressure measuring system/device as described herein was fabricated using a three-dimensional (3D) printer. An image of the pumpless blood pressure measuring system/device is shown in FIG. 13. A finite element analysis of stress in the tourniquet mechanism of the pumpless blood pressure measuring system/device was performed, and the results are shown in FIGS. 11A and 11B.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A wearable device for measuring blood pressure without the use of a pump, the wearable device comprising:
   a body comprising a display; and
   a band mechanism connected to the body,
   the band mechanism comprising:
      a first band having a first side thereof connected to a first side of the body;
      a second band having a first side thereof connected to a second side of the body opposite from the first side of the body;
      at least one pressure sensor, the at least one pressure sensor comprising a first pressure sensor connected to the first band; and
      a tourniquet mechanism connected to the first band and the second band,
   the tourniquet mechanism being connected to a second side of the first band opposite from the first side of the first band and connected to a second side of the second band opposite from the first side of the second band,
   the tourniquet mechanism being configured for a user of the wearable device to manually tighten and loosen the band mechanism,
   at least one of the first band and the second band being a tension band,
   the wearable device excluding a pump,
   the body further comprising a processor and a machine-readable medium in operable communication with the processor,
   the display being in operable communication with the processor,
   the at least one pressure sensor being in operable communication with the processor,
   the machine-readable medium comprising instructions stored thereon that, when executed by the processor, perform the following steps:
      a) receiving an initial pressure reading from the at least pressure sensor;
      b) determining, based on the initial pressure reading, if a predetermined pressure indicative of artery occlusion of the user of the wearable device has been reached;
      c1) if the predetermined pressure has not been reached, indicating to the user of the wearable device that the band mechanism should be tightened using the tourniquet mechanism by providing a first audible beep, and then repeating steps a) and b);
      c2) if the predetermined pressure has been reached, indicating to the user of the wearable device that no further tightening of the band mechanism is required by providing a second audible beep different from the first audible beep;
      d) receiving subsequent pressure readings from the at least one pressure sensor as the band mechanism is loosened;
      e) measuring a systolic blood pressure of the user of the wearable device based on the subsequent pressure readings;
      f) measuring a diastolic blood pressure of the user of the wearable device based on the subsequent pressure readings; and g) displaying the systolic blood pressure and the diastolic blood pressure on the display, and the tourniquet mechanism comprising:
a pinion shaft;
a pinion gear connected to the pinion shaft;
a rack having rack teeth and disposed such that the rack teeth interlock with pinion gear teeth of the pinion gear;
a ratchet gear having ratchet gear teeth and disposed such that the ratchet gear teeth interlock with the pinion gear teeth of the pinion gear;
a ratchet lock configured to lock the ratchet gear in place; and
a ratchet tool removably attached to the ratchet gear, the ratchet tool being configured to release the ratchet lock to release tension and thereby loosen the band mechanism,
the ratchet tool being a pin or a rod.

2. The wearable device according to claim 1, the tourniquet mechanism further comprising a turning tool attached to the pinion shaft and configured to turn the pinion shaft in order to tighten the band mechanism.

3. The wearable device according to claim 2, the turning tool being removably attached to the pinion shaft.

4. The wearable device according to claim 1, the at least one pressure sensor further comprising a second pressure sensor connected to the second band.

5. The wearable device according to claim 4, the first pressure sensor being a first pressure plate, and the second pressure sensor being a second pressure plate.

6. The wearable device according to claim 1, the wearable device being configured to be worn around a wrist of the user of the wearable device.

7. The wearable device according to claim 6, the wearable device being a wrist watch.

8. A method for measuring blood pressure without the use of a pump, the method comprising:
a) providing to a user a wearable device, the wearable device comprising:
a body comprising a display, a processor in operable communication with the display, and a machine-readable medium in operable communication with the processor; and
a band mechanism connected to the body;
the band mechanism comprising:
a first band having a first side thereof connected to a first side of the body;
a second band having a first side thereof connected to a second side of the body opposite from the first side of the body;
at least one pressure sensor, the at least one pressure sensor comprising a first pressure sensor connected to the first band; and
a tourniquet mechanism connected to the first band and the second band,
the at least one pressure sensor being in operable communication with the processor,
the tourniquet mechanism being connected to a second side of the first band opposite from the first side of the first band and connected to a second side of the second band opposite from the first side of the second band,
the tourniquet mechanism being configured for the user of the wearable device to manually tighten and loosen the band mechanism,
at least one of the first band and the second band being a tension band, and
the wearable device excluding a pump;
b) receiving an initial pressure reading from the at least pressure sensor;
c) determining, based on the initial pressure reading, if a predetermined pressure indicative of artery occlusion of the user of the wearable device has been reached;
d1) if the predetermined pressure has not been reached, indicating to the user of the wearable device that the band mechanism should be tightened using the tourniquet mechanism by providing a first audible beep, and then repeating steps b) and c) after the user has tightened the band mechanism using the tourniquet mechanism;
d2) if the predetermined pressure has been reached, indicating to the user of the wearable device that no further tightening of the band mechanism is required and that tension in the band mechanism should be released using the tourniquet mechanism by providing a second audible beep different from the first audible beep;
e) receiving subsequent pressure readings from the at least one pressure sensor as the band mechanism is loosened after the user has released tension in the band mechanism using the tourniquet mechanism;
f) measuring a systolic blood pressure of the user of the device based on the subsequent pressure readings;
g) measuring a diastolic blood pressure of the user of the device based on the subsequent pressure readings; and
h) displaying the systolic blood pressure and the diastolic blood pressure on the display, the tourniquet mechanism comprising:
a pinion shaft;
a pinion gear connected to the pinion shaft;
a rack having rack teeth and disposed such that the rack teeth interlock with pinion gear teeth of the pinion gear;
a ratchet gear having ratchet gear teeth and disposed such that the ratchet gear teeth interlock with the pinion gear teeth of the pinion gear;
a ratchet lock configured to lock the ratchet gear in place; and
a ratchet tool removably attached to the ratchet gear, the ratchet tool being configured to release the ratchet lock to release tension and thereby loosen the band mechanism,
the ratchet tool being a pin or a rod.

9. The method according to claim 8, the indicating to the user of the wearable device that the band mechanism should be tightened using the tourniquet mechanism in step d1) further comprising displaying instructions on the display.

10. The method according to claim 8, the indicating to the user of the wearable device that no further tightening of the band mechanism is required and that tension in the band mechanism should be released using the tourniquet mechanism in step d2) further comprising displaying instructions on the display.

11. The method according to claim 8, the tourniquet mechanism further comprising:
a turning tool removably attached to the pinion shaft and configured to turn the pinion shaft in order to tighten the band mechanism.

12. The method according to claim 8, the at least one pressure sensor further comprising a second pressure sensor connected to the second band,
the first pressure sensor being a first pressure plate, and the second pressure sensor being a second pressure plate.

13. A wearable device for measuring blood pressure without the use of a pump, the wearable device comprising:
- a body comprising a display, a processor in operable communication with the display, and a machine-readable medium in operable communication with the processor; and
- a band mechanism connected to the body,
- the band mechanism comprising:
    - a first band having a first side thereof connected to a first side of the body;
    - a second band having a first side thereof connected to a second side of the body opposite from the first side of the body;
    - at least one pressure sensor, the at least one pressure sensor comprising a first pressure sensor connected to the first band and a second pressure sensor connected to the second band; and
    - a tourniquet mechanism connected to the first band and the second band,
- the tourniquet mechanism being connected to a second side of the first band opposite from the first side of the first band and connected to a second side of the second band opposite from the first side of the second band,
- the tourniquet mechanism being configured for a user of the wearable device to manually tighten and loosen the band mechanism,
- at least one of the first band and the second band being a tension band,
- the wearable device excluding a pump,
- the tourniquet mechanism comprising:
    - a pinion shaft;
    - a pinion gear connected to the pinion shaft;
    - a rack having rack teeth and disposed such that the rack teeth interlock with pinion gear teeth of the pinion gear;
    - a ratchet gear having ratchet gear teeth and disposed such that the ratchet gear teeth interlock with the pinion gear teeth of the pinion gear;
    - a ratchet lock configured to lock the ratchet gear in place;
    - a turning tool removably attached to the pinion shaft and configured to turn the pinion shaft in order to tighten the band mechanism; and
    - a ratchet tool removably attached to the ratchet gear, the ratchet tool being configured to release the ratchet lock to release tension and thereby loosen the band mechanism,
- the ratchet tool being a pin or a rod,
- the first pressure sensor being a first pressure plate,
- the second pressure sensor being a second pressure plate,
- the at least one pressure sensor being in operable communication with the processor,
- the wearable device being configured to be worn around a wrist of the user of the wearable device, and
- the machine-readable medium comprising instructions stored thereon that, when executed by the processor, perform the following steps:
    - a) receiving an initial pressure reading from the at least pressure sensor;
    - b) determining, based on the initial pressure reading, if a predetermined pressure indicative of artery occlusion of the user of the wearable device has been reached;
    - c1) if the predetermined pressure has not been reached, indicating to the user of the wearable device that the band mechanism should be tightened using the tourniquet mechanism by providing a first audible beep, and then repeating steps a) and b);
    - c2) if the predetermined pressure has been reached, indicating to the user of the wearable device that no further tightening of the band mechanism is required by providing a second audible beep different from the first audible beep;
    - d) receiving subsequent pressure readings from the at least one pressure sensor as the band mechanism is loosened;
    - e) measuring a systolic blood pressure of the user of the wearable device based on the subsequent pressure readings;
    - f) measuring a diastolic blood pressure of the user of the wearable device based on the subsequent pressure readings; and
    - g) displaying the systolic blood pressure and the diastolic blood pressure on the display.

* * * * *